March 6, 1928.  1,661,822

J. M. HALL

SHOCK ABSORBER

Filed March 16, 1927

Inventor
Joseph M. Hall
By Popp & Powers
Attorneys

Patented Mar. 6, 1928.                                          1,661,822

UNITED STATES PATENT OFFICE.

JOSEPH M. HALL, OF HAMILTON, ONTARIO, CANADA, ASSIGNOR TO UNIVERSAL DRAFT GEAR ATTACHMENT CO., OF CHICAGO, ILLINOIS, A CORPORATION OF ILLINOIS.

SHOCK ABSORBER.

Application filed March 16, 1927. Serial No. 175,721.

This invention relates to a friction shock absorber which is more particularly intended for use on railway cars, although the same may be employed in other installations where heavy shocks must be cushioned.

It is the object of this invention to provide a shock absorber for this purpose containing a plurality of intercalated friction plates which is comparatively simple in construction, efficient in operation, and capable of being produced at low cost.

Figure 1:
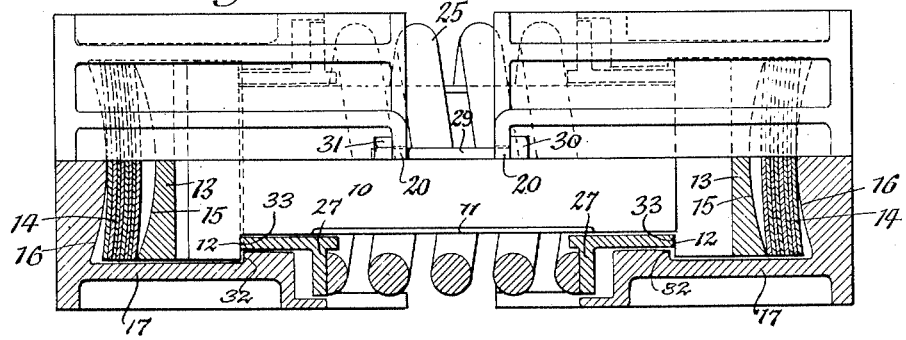
Figure 2:
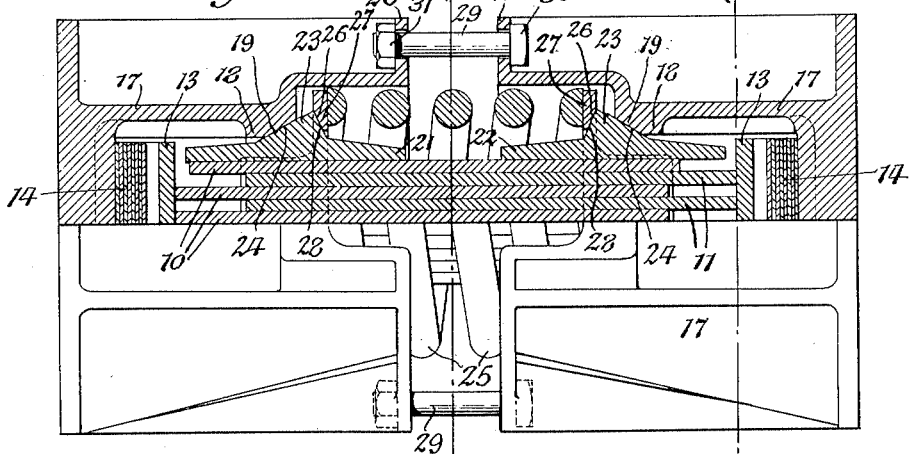
Figure 3:
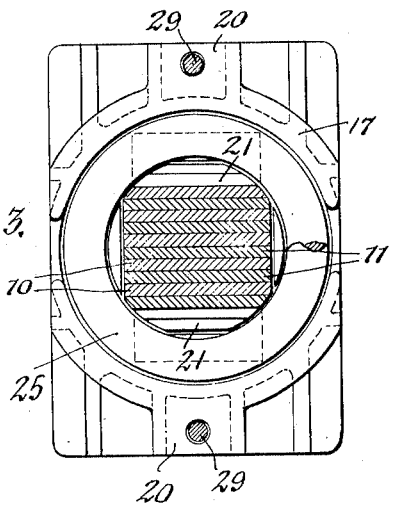
Figure 4:
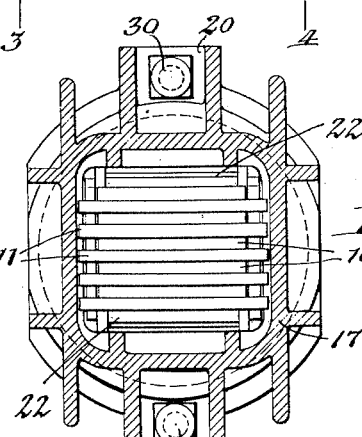

In the accompanying drawings:

Figure 1 is a top plan view of the improved shock absorber partly in section. Figure 2 is a side elevation of the same, partly in section. Figures 3 and 4 are vertical cross sections taken on the correspondingly numbered lines in Fig. 2.

In the following description similar characters of reference indicate like parts in the several figures of the drawings.

As is well known, shock absorbers of this character are interposed between the relatively movable members of a railway draft gear so that when the same is subjected to a buffing action the shock absorber will be closed more or less in one direction and when subjected to a pulling action the shock absorber will be closed more or less in the opposite direction.

The numerals 10, 11 represent two sets of intercalated friction plates of metal which engage each other on their flat sides and each of which is provided on opposite longitudinal edges adjacent to the outer end thereof with inwardly facing shoulders 12. Adjacent to the outer ends of the two sets of friction plates are arranged two main thrust followers which are movable lengthwise of the gear toward and from each other and which are moved inwardly by the shock of the load imposed on the gear and returned to the outer normal position by spring pressure.

The outer ends of each set of friction plates are engaged by a release follower 13 and between the outer side of each release follower and the respective main follower is arranged a release spring 14. The inner side of each main follower and the opposing outer side of the adjacent release follower are curved opposite to one another, the outer side 15 of the release follower being preferably concave and the inner side 16 of the main follower convex, as shown in Fig. 1. The release spring 14 preferably consists of a pack or stack of superposed spring plates the central part of which normally rests on the salient central part of the convex inner side of the main follower and the opposite ends thereof engaging with the extremities of the concave outer face of the companion release follower, as shown in Fig. 1.

Projecting inwardly from each main follower wall is a housing or tubular wall 17 which encloses the respective release spring, release follower, the means for pressing the plates together, and one end of the main spring resistance. On opposite inner sides of the central parts of each housing the same are provided with wedge members 18 having inwardly diverging inclined faces 19 and at the inner end of the housing the same is provided on its opposite sides with laterally projecting stop lugs 20.

The numeral 21, 22, represents two pairs of pressure shoes which engage with the opposite sides of the pack of friction plates at opposite ends thereof and each shoe having a laterally projecting rib 23 the outer side of which has an incline face 24 which engages with the incline 19 of one of the wedge members, the inclines 24 of the shoes of a pair converging outwardly. Surrounding the central parts of the friction plates and the inner ends of the pressure shoes is a main resistance 25 having the form of a helical spring the ends of which are arranged within the inner parts of the housings and engage with spring seats 27 having inwardly converging shoulders 26 which engage with inwardly converging shoulders 28 formed on the inner sides of the ribs of the pressure shoes so as to resist inward movement of the same. Each of the spring seats is provided on its outer side with outwardly facing shoulders 33 which are adapted to engage the inwardly facing shoulders 12 of the respective set of friction plates.

Expansion of the shock absorber when released is limited by stop bolts 29 passing lengthwise through the stop lugs 20 on the inner ends of the housings and bearing with their shoulders formed by their heads 30 and nuts 31 against the outer sides of said stop lugs and thus arresting the movement of the main followers away from one another when the same have separated a predetermined distance.

Each of the housings is provided on its inner side with outwardly facing return shoulders 32 which are adapted to engage the inwardly facing shoulders 12 of the friction plates.

As each main follower is forced to approach the follower on the opposite end of the gear, the release springs are first compressed, forming a solid member between each main follower and release follower. This is made possible by having enough initial compression in the main spring to create enough wedging pressure on the friction plates so that a resistance against sliding longitudinally is obtained which is great enough to overcome the capacity of the release springs when the same are forced against the outer ends of the friction plates in the initial compression of the draft gear. During this time the wedge members of the housing by engaging their inclines with those of the pressure shoes operate to press the latter transversely inward and thus increase the frictional grip between the plates and the resistance which they offer to inward movement one relatively to the other. After the release springs have been compressed solid the friction plates are forced to move longitudinally relatively to one another under the same wedging action until the housings come into contact with each other at their inner ends. The housings then resist any further longitudinal pressure and carry over solid capacities imposed on the draft gear. Release action takes place when the load on the draft gear is reduced sufficiently to permit the force of one of the release springs to move the active housing outwardly, thereby relieving the wedging pressures at the angular surfaces between the shoes and the wedge members. The opposite release spring next to the inactive housing also moves the adjacent plates away from the opposite follower. This allows the expansive action of the main spring to move spring seats and shoes outwardly until the shoulders 33 of the spring seats come in contact with the shoulders 12 of the friction plates. This contact produces an outward movement of the friction plates at each end of the gear due to the spring seats traveling outwardly under the expansion of main spring. During the time of the release action release springs continually tend to reduce wedging pressures which might be set up at the angular contact between the shoes and the wedge members of the housing. The shoulders 32 on the housing serve the purpose of limiting the outward movement of the main followers relative to the friction plates and thus limit the release action at both ends of the draft gear.

I claim as my invention:

1. A shock absorber comprising a plurality of sets of intercalated friction plates which are adapted to move lengthwise relatively to one another, release followers engaging the outer ends of said sets of plates, main thrust followers movable one toward and from the other, release springs interposed between said release followers and said main thrust followers, lateral pressure creating means for pressing said plates together transversely, and a main spring resistance co-operating with said lateral pressure creating means.

2. A shock absorber comprising a plurality of sets of intercalated friction plates which are adapted to move lengthwise relatively to one another, release followers engaging the outer ends of said sets of plates, main thrust followers, one movable toward and from the other, and arranged adjacent to said release followers, the inner side of each main follower and the opposing outer side of the respective release follower being curved opposite to one another, a release spring arranged between the opposing curved surfaces of each release follower and the companion main follower and composed of a plurality of superposed spring plates, lateral pressure creating means for pressing said friction plates together transversely, and a main spring resistance co-operating with said lateral pressure creating means.

3. A shock absorber comprising a plurality of sets of intercalated friction plates which are adapted to move lengthwise relatively to one another, release followers engaging the outer ends of said sets of plates, main thrust followers, one movable toward and from the other, and arranged adjacent to said release followers, the inner side of each main follower and the opposing outer side of the respective release follower being curved opposite to one another, a release spring arranged between the opposing curved surfaces of each release follower and the companion main follower and composed of a plurality of spring plates, lateral pressure creating means for pressing said friction plates together transversely, consisting of wedge members arranged on the inner side of each main follower and having inwardly diverging inclined faces and friction shoes engaging said friction plates and provided with outwardly converging inclined faces which engage with the inwardly diverging faces of said wedge members, and a main spring resistance which operates to yieldingly resist inward movement of said shoes.

4. A shock absorber comprising a plurality of sets of intercalated friction plates which are adapted to move lengthwise relatively to one another, release followers engaging the outer ends of said sets of plates, main thrust followers one movable toward and from the other, and arranged adjacent to said release followers, the inner side of each main follower and the opposing outer side of the respective release follower being curved opposite to one another, a release spring arranged between the opposing curved surfaces of each release follower and the companion main follower and composed of a plurality of spring plates, lateral pressure creating means for pressing said friction plates together transversely, consisting of wedge members arranged on the inner side of each main follower and having inwardly diverging inclined faces and friction shoes engaging said friction plates and provided with outwardly converging inclined faces which engage with the inwardly diverging faces of said wedge members, a main spring resistance which operates to yieldingly resist inward movement of said shoes, and stop bolts connecting said housings and operating to limit the separation of said main followers.

5. A friction shock absorber comprising two main followers movable one lengthwise toward and from the other and each having an inwardly projecting housing, a plurality of sets of intercalated friction plates movable lengthwise relatively to one another and having their opposite ends arranged within the housings of said main followers, release followers arranged within said housings and each engaging the outer ends of one set of friction plates, release springs each interposed between one of said main followers and the adjacent release follower, wedge members arranged on the inner sides of the central parts of said housings and having inwardly diverging inclined faces, friction shoes engaging with the friction plates and having outwardly converging inclines which engage with said inwardly diverging faces, a main resistance spring having its opposite ends arranged within said housings and operating to yieldingly resist inward movement of said shoes, and stop bolts connecting the opposing inner ends of said housings and operating to limit the separation of said main followers and the releasing of the shock absorber.

In testimony whereof, I hereby affix my signature.

JOSEPH M. HALL.